UNITED STATES PATENT OFFICE.

JOSEPH FRANKLIN GENT, OF COLUMBUS, INDIANA.

ART OF MAKING A PRODUCT FROM INDIAN CORN KNOWN AS CEREALINE.

SPECIFICATION forming part of Letters Patent No. 304,722, dated September 9, 1884.

Application filed November 17, 1883. (No specimens.)

*To all whom it may concern:*

Be it known that I, JOSEPH F. GENT, a citizen of the United States, residing at Columbus, in the county of Bartholomew and State of Indiana, have invented certain new and useful Improvements in the Art of Making a Product from Indian Corn Known in the Market as Cerealine; and I do hereby declare the following to be a full, clear, and exact description of the invention, such as will enable other skilled in the art to which it appertains to make and use the same.

My invention relates to the art of manufacturing the product from Indian corn described in my United States Letters Patent No. 223,847, and now known in the market as "cerealine" and by other names. The process of making it described in said Letters Patent involves the loss or waste of a large percentage of the starchy portion of the corn in the clipping, even when the greatest care is exercised.

The object of my invention is to avoid this loss or waste, and thus manufacture cerealine so economically that it can be sold at prices making it available for distilling purposes as well as for brewing purposes and as an edible. To this end I proceed as follows: The corn is first thoroughly cleaned in the dry state. It is then steamed just enough to soften and toughen the germs and husks, so that they may not grind up in the reduction which follows, while the glutinous or starchy interior remains practically unaffected by the steam. The corn thus steamed is immediately coarsely ground or broken, preferably between corrugated rolls, reducing it to a coarse meal composed of separate hulls, germs, and granules of the starchy portion mixed with some little finely-reduced starchy meal. This material is at once screened to separate therefrom the hulls as well as the fine meal. The remaining material, composed of coarse starchy granules and germs, is then sized into grades by means of suitable screens or sieves, and then, while the germs are still soft, submitted, each grade separately, to the action of a mechanical picker or germ-extractor (such, for instance, as is described in an application for patent filed by me November 19, A. D. 1883, Serial No. 112,085) for picking or extracting the soft germs from the harder coarse starchy granules. This cleansed granular material is then again steamed to soften it, and is finally, while still soft, pressed and dried, preferably by passing it through hot rolls, so that the granules will be flattened into thin hard flakes, which constitute the cerealine.

The advantages of the use of cerealine for distilling spirituous liquors are similar to the advantages derived from its use in the brewing of malt liquors. It can be reduced very much more perfectly and more rapidly, at a very much lower temperature than the corn-meal now commonly used. Thus great economy in the expenditure of steam, time, and labor is effected in preparing the mash.

I claim as my invention—

The improvement in the art of making cerealine which consists of the following steps, substantially as before set forth, viz: first, steaming the corn just enough to soften and toughen the hulls and germs; second, coarsely grinding or breaking the steamed corn and separating the hulls and the fine meal from the ground or broken material; third, picking the germs from the coarse starchy particles; fourth, steaming the thus cleansed starchy particles; and, fifth, pressing and drying the steamed starchy particles to reduce them to thin flakes.

In testimony whereof I affix my signature in presence of two witnesses.

JOSEPH FRANKLIN GENT.

Witnesses:
E. P. WALKER,
W. M. HANNAY.